United States Patent [19]

Louthan et al.

[11] 4,258,742

[45] Mar. 31, 1981

[54] TAPPING APPARATUS

[75] Inventors: Jean H. Louthan, Dallas; Ralph A. Wynne, Marshall, both of Tex.

[73] Assignee: Phillips Petroleum Company, Bartlesville, Okla.

[21] Appl. No.: 26,503

[22] Filed: Apr. 3, 1979

[51] Int. Cl.³ .................. F16K 43/00; F16L 55/10
[52] U.S. Cl. .................. 137/318; 29/157 T; 29/235; 29/407; 285/197; 285/355; 408/87; 408/137; 408/204
[58] Field of Search .................. 137/315, 317, 318; 285/197, 245, 251, 179, 355; 29/157 T, 235, 237, 453, 407, 157 A; 408/87, 92, 137, 204

[56] References Cited

U.S. PATENT DOCUMENTS

| | | | |
|---|---|---|---|
| 2,087,185 | 7/1937 | Dillon | 285/355 |
| 2,112,108 | 3/1938 | Mackenzie | 285/355 |
| 2,500,276 | 3/1950 | Church | 285/355 |
| 2,736,335 | 2/1956 | Webber | 137/318 |
| 2,785,910 | 3/1957 | Munger | 285/179 |
| 3,240,226 | 3/1966 | Burkholder | 137/318 |
| 3,460,553 | 8/1969 | Leopold, Jr. et al. | 137/15 |
| 3,771,546 | 11/1973 | Roos | 137/318 |
| 3,791,680 | 2/1974 | Cleare | 285/251 |
| 4,029,118 | 6/1977 | Merideth | 137/318 |
| 4,059,291 | 11/1977 | Acda et al. | 285/180 |
| 4,063,844 | 12/1977 | Pessia | 285/197 |
| 4,076,038 | 2/1978 | Wynne | 137/318 |

Primary Examiner—Martin P. Schwadron
Assistant Examiner—G. L. Walton

[57] ABSTRACT

Tapping apparatus is provided for cutting an opening in the wall of a conduit and providing fluid tight communication between such opening and a second conduit via a rotatable outlet to facilitate alignment and connection of the second conduit to the tapping apparatus.

23 Claims, 4 Drawing Figures

TAPPING APPARATUS

This invention relates generally to tapping of conduits. In one aspect the invention relates to method and apparatus for tapping conduits. In another aspect the invention relates to method and apparatus for tapping a conduit which facilitates connection of the apparatus to a second conduit.

When it is necessary to connect one end of a conduit to a central portion of an existing conduit, it is desirable to use an apparatus and method whereby the completed connection between the two conduits is provided by an apparatus which facilitates both the tapping of the existing conduit and the connection of the other conduit thereto. For example, for an underground service line connection to an underground main conduit, it is often difficult to achieve precise alignment between the main conduit, the tapping apparatus and the service line connection due to the relative positions of the conduits in the ground and the difficulty of moving such buried conduits relative to one another.

The method ordinarily employed to tap a conduit for such purposes is to clamp or otherwise affix a tee connection to the main conduit, connect the rigid output end of the tee connection to the service line which is to be connected to the main conduit, then form an opening in the main conduit to provide fluid communication between the conduit and the service line via the tee connection. Such tee connections with rigid output ends can present difficulties in achieving alignment between the output end and the service line.

It is, therefore, an object of the invention to provide improved method and apparatus for tapping a conduit. Another object of the invention is to provide method and apparatus for tapping a conduit which facilitates alignment of the service line, tapping apparatus and conduit to be tapped. Another object of the invention is to provide conduit tapping method and apparatus which simplifies the interconnection of a service line and a conduit to be tapped.

In accordance with the invention, there is provided apparatus for tapping a conduit which comprises body means having first, second and third passageway means extending therethrough, with the first passageway means being adapted for accepting and maintaining a conduit to be tapped and being in communication with the second passageway means. The second passageway means is additionally in communication with the third passageway means for providing fluid communication between the second passageway means and the third passageway means. The apparatus further includes cutter means for cutting an opening in a conduit located within the first passageway means, the cutter means having means for engaging the second passageway means. The third passageway means includes an internally threaded portion in one end portion thereof opposite the second passageway means, and a generally cylindrical inner surface extending from a position proximate to the externally threaded portion toward the second passageway means. The apparatus additionally includes a tubular member having first and second end portions with the first end portion of the tubular member having a first end face, a first generally cylindrical outer surface extending away from the first end face toward the second end portion of the tubular member, a circumferential annular groove in the first generally cylindrical outer surface, and an externally threaded portion extending away from the first generally cylindrical outer surface toward the second end portion of the tubular member. The externally threaded portion of the tubular member is threadedly engageable with the internally threaded portion of the third passageway means, and the first generally cylindrical outer surface is sized so as to be closely received within the generally cylindrical inner surface of the third passageway means when the externally threaded portion of the tubular member is threadedly engaged with the internally threaded portion of the third passageway means. The tubular member further includes a passage extending through and communicating with the first end face of the tubular member. The apparatus additionally includes resilient annular seal means disposed in the circumferential annular groove of the tubular member for providing sealing engagement between the tubular member and the generally cylindrical inner surface of the third passageway means when the externally threaded portion of the tubular member is threadedly engaged with the internally threaded portion of the third passageway means. A tubular reinforcing member is positioned within the passage through the tubular member and extends from a position proximate to the first end face of the tubular member toward the second end portion of the tubular member.

Other objects and advantages of the invention will be apparent from the appended claims and from the detailed description of the invention when read in conjunction with the accompanying drawing in which:

Figure 1:
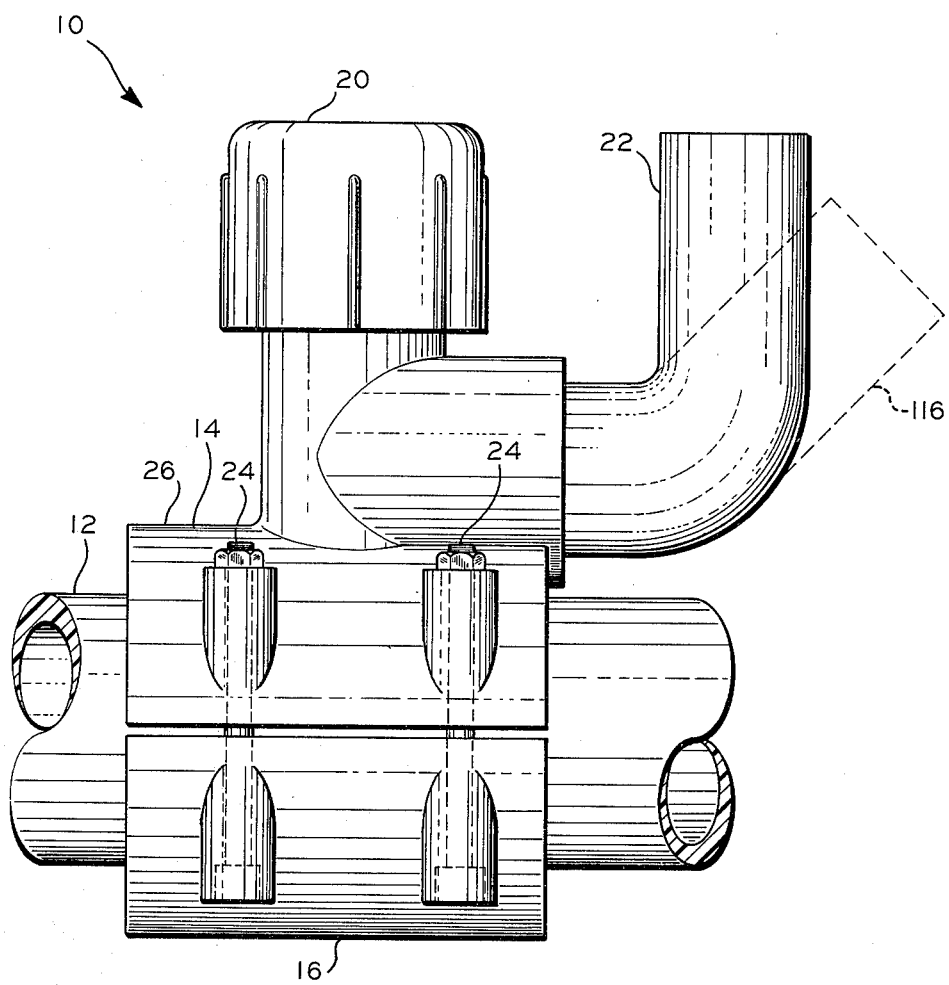
FIG. 1 is a side elevation view of a tapping apparatus constructed in accordance with the invention and mounted on a conduit to be tapped.

Referring now to the drawings, a mechanical tapping apparatus or tee constructed in accordance with the present invention is disclosed therein and is generally designated by the reference character 10. The tapping tee 10 is shown installed on a segment of pipe or conduit 12.

The mechanical tapping tee 10 generally comprises a body member 14, a body clamp member 16, a cutter 18, a cap 20, and a tubular outlet member or elbow 22.

The body member 14 and body clamp member 16 are securable together by four threaded bolts 24 to form a body assembly enclosing a section of the pipe 12 to be tapped. The body member 14 is provided with a first passageway 28 having a generally semicylindrical inner surface sized to closely receive the cylindrical outer surface of the pipe 12 thereagainst. Similarly, the body clamp member 16 is provided with a generally semicylindrical inner surface 30 which is also sized to closely receive the cylindrical outer surface of the pipe 12. The generally rectangular array of radially inwardly extending ridges 32 is formed on the inner surface 30 of the body clamp member 16 to facilitate the maintenance of frictional engagement between the body clamp member and the pipe 12.

A second passageway 34 extends through the body member 14 with the first end portion 36 of the second passageway 34 intersecting the first passageway 28 at an angle of approximately 90°. The second passageway 34 includes an internally threaded portion 38.

A third passageway 40 is formed in the body member 14 with the first end portion 42 thereof intersecting the second passageway 34 at an angle of approximately 90° and with the second end portion 44 thereof communicating with the exterior of the body member 14. The third passageway 40 includes a generally cylindrical inner surface 46 formed in the first end portion 42 thereof and an internally threaded portion 48 formed in the second end portion 44 thereof. An annular wall 50 extends generally radially outwardly from the generally cylindrical inner surface 46 intermediate the first and second end portions 42 and 44.

The body member 14 is further characterized to include an annular groove 52 formed in the generally semicylindrical inner surface of the first passageway 28 surrounding, and substantially concentric with the first end portion 36 of the second passageway 34 at the intersection thereof with the first passageway 28. A suitable resilient annular seal 54, preferably an elastomeric O-ring, is disposed within the annular groove 52 and provides fluid tight sealing engagement between the body member 14 and the cylindrical outer surface of the pipe 12.

The upper end portion 56 of the body member 14 is provided with a generally cylindrical outer surface 58 substantially coaxially aligned with the longitudinal axis of the second passageway 34. An annular groove 60 is formed in the generally cylindrical outer surface 58 and carries a suitable resilient annular seal 62, preferably an elastomeric O-ring, therein. The upper end portion 56 of the body member 14 further includes an externally threaded portion 64 coaxially aligned with and extending downwardly from the generally cylindrical outer surface 58.

Figure 3:
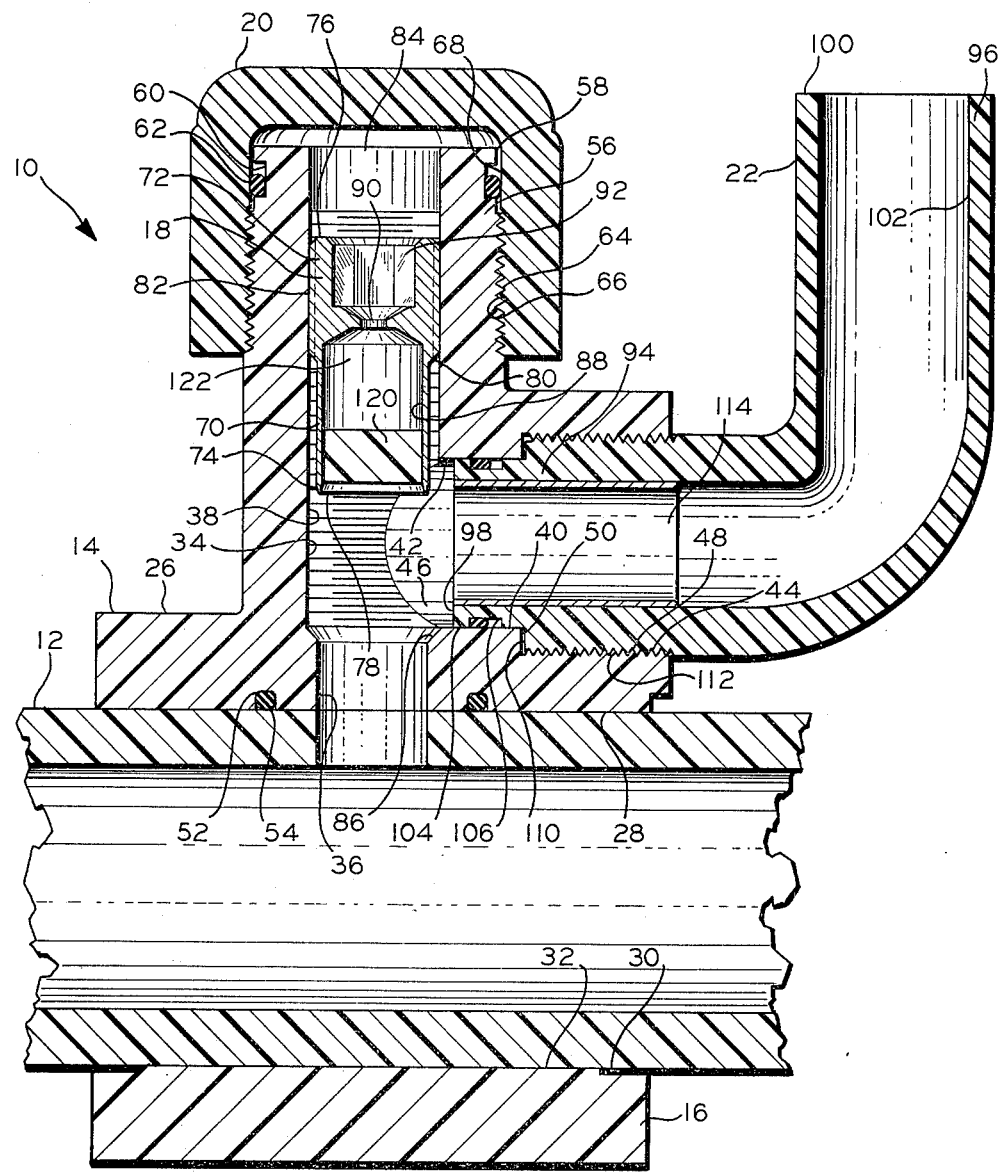
FIG. 3 is a vertical cross-sectional view taken along the centerline of the tapping apparatus and conduit to be tapped.
Figure 4:
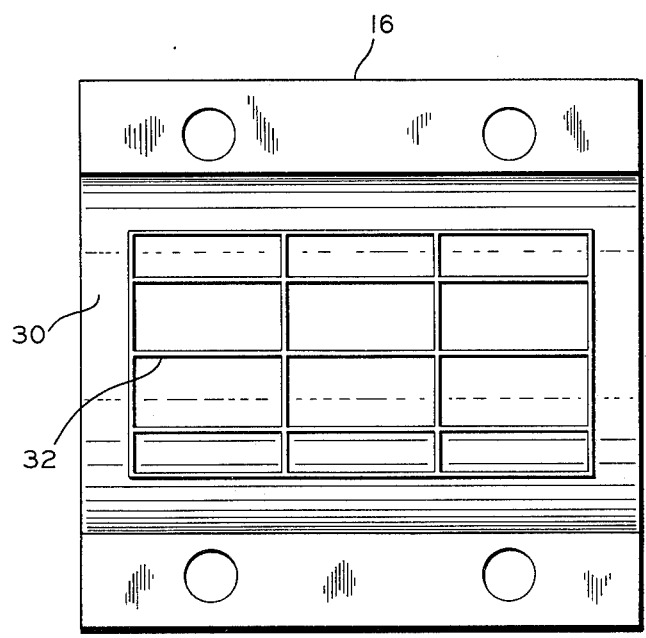
FIG. 4 is a top plan view of the body clamp member of the tapping apparatus illustrating the surface configuration of the generally semicylindrical inner surface thereof.

The cap 20 is provided with an internally threaded portion 66 which provides means for threadedly engaging the cap 20 with the body member 14. The cap 20 further includes a generally cylindrical inner surface 68 which extends upwardly from the internally threaded portion 66 and is sized to be closely received about the generally cylindrical outer surface 58 of the body member 14. The resilient annular seal 62 provides fluid tight sealing engagement between the body member 14 and the generally cylindrical inner surface 68 of the cap 20 when the cap is threadedly secured on the body member 14 as illustrated in FIG. 3.

The cutter 18 is positioned within the second passageway 34 of the body member 14. The cutter 18 is provided with first and second end portions 70 and 72, first and second ends 74 and 76, a cutting surface 78 formed on the first end 74, a shoulder 80 positioned a preselected distance from the first end 74, and external threads 82 formed about the outer periphery of the cutter 18 between the second end 76 and the shoulder 80. The threads 82 are threadedly engageable with the internally threaded portion 38 of the second passageway 34, which internally threaded portion 38 extends generally from the second end portion 84 of the second passageway 34 to a location adjacent a generally radially inwardly extending annular wall 86 formed in the second passageway 34. The internally threaded portion 38 of the second passageway 34 and the external threads 82 of the cutter 18 provide means for moving the cutter 18 through the second passageway 34 in response to rotation of the cutter relative to the body member 14 and can form a relatively tight seal between the cutter 18 and the second passageway 34. A tubular passageway 88 is formed in the cutter 18 and extends generally from the first end 74 to a small opening 90 in the bottom of a hexagonal shaped tool socket 92 for providing means for testing the service lines connected to the tapping tee 10 prior to cutting a hole in the pipe 12.

The tubular outlet member or elbow 22 is provided with first and second end portions 94 and 96, first and second end faces 98 and 100, and a passageway 102 communicating between the first and second end faces 98 and 100. A first generally cylindrical outer surface 104 extends away from the first end face 98 toward the second end portion 96 of the tubular member 22. The generally cylindrical outer surface 104 is sized to be closely received within the generally cylindrical inner surface 46 of the third passageway 40. A circumferential annular groove 106 is formed in the generally cylindrical outer surface 104 and a suitable resilient annular seal 108, preferably an elastomeric O-ring, is disposed within the annular groove 106 for providing a fluid tight seal between the tubular outlet member 22 and the cylindrical inner surface 46 of the third passageway 40. An annular wall 110 extends generally radially outwardly from the first cylindrical outer surface 104. An externally threaded portion 112 is formed on the exterior of the tubular outlet member 22 and extends from a position proximate to the annular wall 110 toward the second end portion 96 of the tubular member 22. The externally threaded portion 112 is threadedly engageable with the internally threaded portion 48 of the third passageway 40 and provides means for rotatably securing the tubular outlet member 22 to the body member 14 with the resilient annular seal 108 providing the aforementioned fluid tight seal between the tubular outlet member and the body member 14. A tubular reinforcing member 114 is fixedly secured in the passageway 102 at the first end portion 94 of the tubular outlet member 22 by suitable means such as a press fit. The reinforcing member 114 preferably extends from a position adjacent the first end face 98 toward the second end portion of the tubular member 22 a predetermined distance substantially coextensive with the cylindrical outer surface 104 and the externally threaded portion 112.

The reinforcing member 114 can be formed of any suitable reinforcing material, but is generally formed of a suitable metallic material or reinforced synthetic resin material. Suitable metallic materials include steel, stainless steel, brass, bronze and aluminum.

The tubular outlet member can be formed of any suitable material, but is generally formed of a synthetic resinous material. Suitable synthetic resinous materials generally include thermoplastic materials such as olefin polymers, a preferred olefin polymer being polyethylene.

The body member 14, body clamp member 16 and cap 20 can also be fabricated of any suitable material. Such suitable materials include synthetic resin materials such as thermoplastics. Suitable thermoplastic materials include olefin polymers and normally solid, moldable polyamide polymers with a preferred olefin polymer being polyethylene and a preferred polyamide polymer being nylon.

Figure 2:
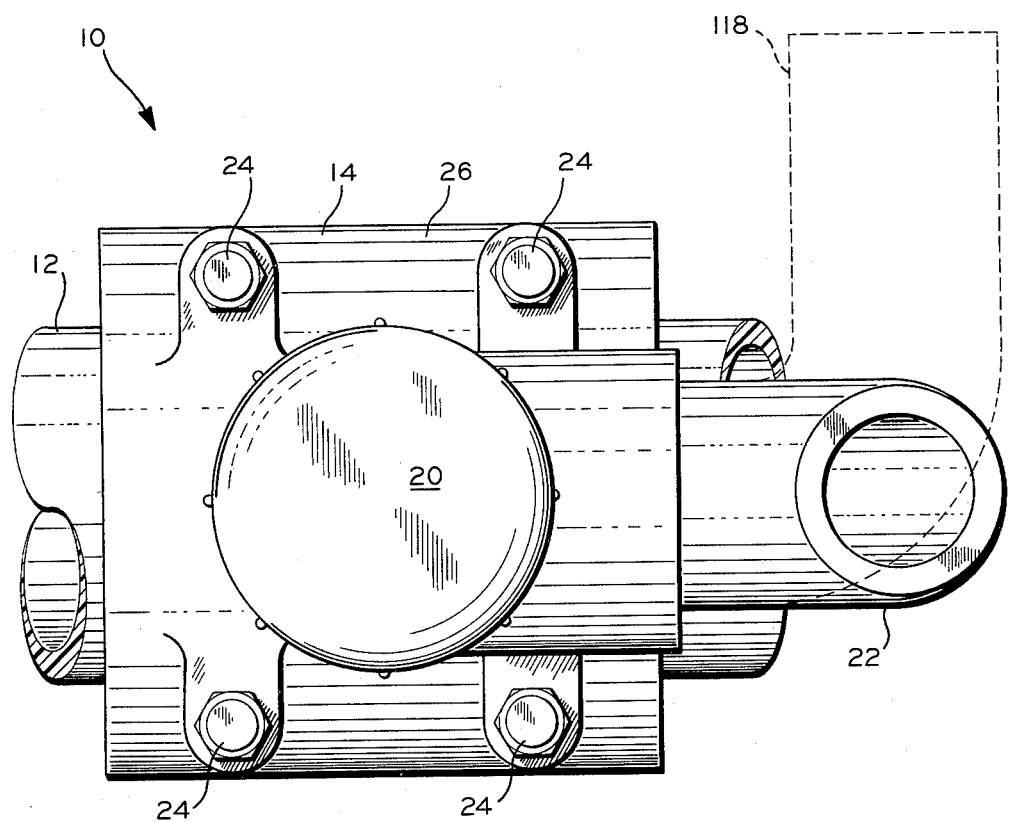
FIG. 2 is a top plan view of the tapping apparatus and conduit of FIG. 1.

FIGS. 1, 2 and 3 illustrate a tapping tee 10 in which the body member 14 and body clamp member 16 thereof have been affixed to a pipe or conduit 12 by means of four threaded bolts 24 interconnecting the bottom member 14 and body clamp member 16. The conduit 12 can be of any suitable material. Such suitable materials include synthetic resin materials such as thermoplastics. Suitable thermoplastic materials include olefin polymers such as polyethylene. The tubular outlet member 22 has been threadedly secured within the third passageway 40 by means of the threaded portions 48 and 112. The outlet member 22 has preferably been threaded into the third passageway 40 until the annular wall 110 of the outlet member 22 has abutted the annular wall 50 in the third passageway 40, the outlet member 22 then being unthreaded any suitable amount, but generally from about 1 to about 2 turns, to permit the outlet member to be freely rotated within the third passageway through a full 360° of rotation while simultaneously maintaining the fluid tight seal and threaded engagement between the outlet member 22 and the generally cylindrical inner surface 46 of the third passageway 40 achieved by the resilient annular seal 108 and the threaded portions 48 and 112. It will be noted that the tubular outlet member is illustrated in solid lines as defining a 90° elbow. It will be understood that the outlet member 22 can be of any suitable shape and can define an elbow having a bend angle in the range from about 0° to about 180°, preferably from about 0° to about 120°. A bend angle of approximately 45° is illustrated in dashed lines in FIG. 1 as shown at 116. In FIG. 2, an alternate, rotated position of the outlet member 22 is illustrated in dashed lines as shown at 118.

In the method of the invention, the tapping tee 10 is positioned about the conduit 12 to be tapped as illustrated in FIGS. 1, 2 and 3. In the ready position, the cutter 18 is threaded into the second passageway 34 spaced from the pipe or conduit 12. With the cutter in this position, the condition of the third passageway 40 and any conduit attached thereto can be checked through the test opening 90 of the cutter 18. The cutter 18 is rotated by inserting a suitable tool in the hexagonal shaped tool socket 92 and rotating the cutter 18 thereby advancing the cutter 18 through the second passageway 34 toward the conduit 12 in response to the cutter threads 82 following the threads 66 on the inside of the second passageway 34. Rotation is continued after contact of the cutting surface 78 of the cutter 18 with conduit 12 for cutting a coupon 120 from the conduit 12 and forcing the coupon into a cavity 122 formed in the first end portion 70 of the cutter 18. The cutter 18 is rotated until the shoulder 80 thereof abuts the annular wall 86 in the second passageway. Rotation of the cutter 18 is then reversed and the cutter, with the coupon 120 secured in the cavity 122 thereof, is moved upwardly to a position adjacent the second end 76 of the second passageway 34. At this location the cutter is sealing the second end portion 84 of the second passageway 34 and provides a pathway for fluid flow from the conduit 12 through a portion of the second passageway 34 and outwardly through the third passageway 40. The presence of the coupon 120 within the cutter 18 precludes any substantial escape of fluid through the small opening 90 and the tool socket 92. The subsequent installation of the cap 20 on the body member 14 assures a fluid tight seal to prevent escape of fluid from the second end portion 84 of the second passageway 34.

The rotatable threaded securement of the tubular outer member 22 to the body clamp member 16 facilitates the alignment of the tubular outlet number with a conduit to which it is to be connected. The tubular outlet member can be connected to such conduit by any suitable means including fusion welding, cementing, mechanical clamping or the like.

In general, material selection for the various components of the mechanical tapping tee 10 should be compatible with the fluid being transported in the pipe or conduit 12 and with the physical strength requirements anticipated at the particular location in which the mechanical tapping tee is to be installed. The apparatus of the invention is particularly suitable for use with lines transporting natural or manufactured gas, air, water, chemicals, and/or other liquids and gases.

Reasonable modifications and alterations of this invention will become apparent to those skilled in the art from the foregoing discussion and accompanying drawing, and it should be understood that this invention is not to be unduly limited thereto.

That which is claimed is:

1. Apparatus for tapping a conduit, said apparatus comprising:

body means having first, second and third passageway means extending therethrough, said first passageway means being adapted for accepting and maintaining a conduit to be tapped and being in communication with a first end portion of said second passageway means, a first end portion of said second passageway means additionally being in communication with a first end portion of said third passageway means for providing flow communication between the first end portion of said second passageway means and a second end portion of said third passageway means;

cutter means for cutting an opening in a conduit located within said first passageway means, said cutter means having means for engaging said second passageway means;

said third passageway means including an internally threaded portion in one end portion thereof opposite said second passageway means, and a generally cylindrical inner surface in the third passageway means extending from a position proximate to said internally threaded portion toward said second passageway means;

a tubular member having first and second end portions, the first end portion of said tubular member having a first end face, a first generally cylindrical outer surface extending away from said first end face toward the second end portion of said tubular member, a circumferential annular groove in said first generally cylindrical outer surface, an externally threaded portion extending away from said first generally cylindrical outer surface toward the second end portion of said tubular member, said externally threaded portion being threadedly engageable with the internally threaded portion of said third passageway means, said first generally cylindrical outer surface being sized so as to be closely received within the generally cylindrical inner surface of said third passageway means when said externally threaded portion of said tubular member is threadedly engaged with the internally threaded portion of said third passageway means, said tubular member further including a passage extending therethrough and communicating with the first end face of said tubular member;

resilient annular seal means disposed in the circumferential annular groove of said tubular member for providing sealing engagement between said tubular member and the generally cylindrical inner surface of said third passageway means when externally threaded portion of said tubular member is threadedly engaged with the internally threaded portion of said third passageway means; and a tubular reinforcing member positioned within the passage through said tubular member and extending from a position proximate to the first end face of said tubular member toward the second end portion of said tubular member.

2. Apparatus in accordance with claim 1 wherein said tubular reinforcing member extends toward the second end portion of said tubular member a distance substantially coextensive with the externally threaded portion of said tubular member.

3. Apparatus in accordance with claim 1 wherein said tubular member is formed of a synthetic resin material, and said tubular reinforcing member is formed of a metallic material.

4. Apparatus in accordance with claim 1 wherein said third passageway means includes a first annular wall extending generally radially outwardly from the generally cylindrical inner surface intermediate said generally cylindrical inner surface and said internally threaded portion of said third passageway means; wherein said tubular member includes a second annular wall extending generally radially outwardly from the first generally cylindrical outer surface intermediate said first generally cylindrical outer surface and the externally threaded portion of said tubular member; and wherein said first and second annular walls are adapted to assume mutually abutting relation so as to provide means for limiting the amount of threaded engagement between said body means and said tubular member.

5. Apparatus in accordance with claim 1 characterized further to include means operable on said body means and on said tubular member for limiting the amount of threaded engagement between said body means and said tubular member.

6. Apparatus in accordance with claim 1 wherein said body means and said tubular member are each formed of a synthetic resin material.

7. Apparatus in accordance with claim 1 wherein said tubular member is formed of a synthetic resin material.

8. Apparatus in accordance with claim 6 or claim 7 wherein said synthetic resin material is an olefin polymer.

9. Apparatus in accordance with claim 8 wherein said olefin polymer is polyethylene.

10. Apparatus in accordance with claim 1 wherein said tubular member is an elbow having a bend angle in the range from about 0° to about 180°.

11. Apparatus in accordance with claim 1 wherein said tubular member is an elbow having a bend angle in the range from about 0° to about 120°.

12. In an apparatus for tapping a conduit of the type which includes:

body means having first, second and third passageway means extending therethrough, said first passageway means being adapted for accepting and maintaining a conduit to be tapped and being in communication with said second passageway means, said second passageway means additionally being in communication with said third passageway means; and cutter means for cutting an opening in a conduit located within said first passageway means; the improvement comprising:

an internally threaded portion in one end portion of said third passageway means opposite said second passageway means, and a generally cylindrical inner surface in said third passageway means and extending from a position proximate to said internally threaded portion toward said second passageway means;

a tubular member having first and second end portions, the first end portion of said tubular member having a first end face, a first generally cylindrical outer surface extending away from said first end face toward the second end portion of said tubular member, a circumferential annular groove in said first generally cylindrical outer surface, an externally threaded portion extending away from said first generally cylindrical outer surface toward the second end portion of said tubular member, said externally threaded portion being threadedly engageable with the internally threaded portion of said third passageway means, said first generally cylindrical outer surface being sized so as to be closely received within the generally cylindrical inner surface of said third passageway means when said externally threaded portion of said tubular member is threadedly engaged with the internally threaded portion of said third passageway means, said tubular member further including a passage extending therethrough and communicating with the first end face of said tubular member;

resilient annular seal means disposed in the circumferential annular groove of said tubular member for providing sealing engagement between said tubular member and the generally cylindrical inner surface of said third passageway means when said externally threaded portion of said tubular member is threadedly engaged with the internally threaded portion of said third passageway means; and tubular reinforcing means positioned within the passage through said tubular member and extending from a position proximate to the first end face of said tubular member toward the second end portion of said tubular member for reinforcing the first end portion of said tubular member.

13. Apparatus in accordance with claim 12 wherein said tubular reinforcing means extends toward the second end portion of said tubular member a distance substantially coextensive with the externally threaded portion of said tubular member.

14. Apparatus in accordance with claim 12 wherein said tubular member is formed of a synthetic resin material, and said tubular reinforcing means is formed of a metallic material.

15. Apparatus in accordance with claim 12 wherein said third passageway means includes a first annular wall extending generally radially outwardly from the generally cylindrical inner surface intermediate said generally cylindrical inner surface and said internally threaded portion of said third passageway means; wherein said tubular member includes a second annular wall extending generally radially outwardly from the first generally cylindrical outer surface intermediate said first generally cylindrical outer surface and the externally threaded portion of said tubular member; and wherein said first and second annular walls are adapted to assume mutually abutting relation so as to provide means for limiting the amount of threaded engagement between said body means and said tubular member.

16. Apparatus in accordance with claim 12 characterized further to include means operable on said body means and on said tubular member for limiting the amount of threaded engagement between said body means and said tubular member.

17. Apparatus in accordance with claim 12 wherein said body means and said tubular member are each formed of a synthetic resin material.

18. Apparatus in accordance with claim 12 wherein said tubular member is formed of a synthetic resin material.

19. Apparatus in accordance with claim 17 or claim 18 wherein said synthetic resin material is an olefin polymer.

20. Apparatus in accordance with claim 19 wherein said olefin polymer is polyethylene.

21. Apparatus in accordance with claim 12 wherein said tubular member is an elbow having a bend angle in the range from about 0° to about 180°.

22. Apparatus in accordance with claim 12 wherein said tubular member is an elbow having a bend angle in the range from about 0° to about 120°.

23. Apparatus in accordance with claim 1 or claim 12 wherein threaded engagement between said externally threaded portion of said tubular member and said internally threaded portion of said third passageway means together with sealing engagement between said tubular member and the generally cylindrical inner surface of said third passageway means provided by said resilient annular seal means provides means for rotatably securing said tubular member to said body means in fluid tight sealing relation.

* * * * *